US011147236B1

(12) United States Patent
Willis (10) Patent No.: US 11,147,236 B1
(45) Date of Patent: Oct. 19, 2021

(54) COLLAPSIBLE DESCENT AND ASCENT AIDS FOR PETS

(71) Applicant: Anthony Willis, Mars Hill, NC (US)

(72) Inventor: Anthony Willis, Mars Hill, NC (US)

(*) Notice: Subject to any disclaimer, the term of this patent is extended or adjusted under 35 U.S.C. 154(b) by 273 days.

(21) Appl. No.: 16/138,005

(22) Filed: Sep. 21, 2018

(51) Int. Cl.
*A01K 1/035* (2006.01)
*A47C 21/00* (2006.01)

(52) U.S. Cl.
CPC .............. *A01K 1/035* (2013.01); *A47C 21/00* (2013.01)

(58) Field of Classification Search
CPC ......... A01K 1/035; A47C 21/00; E04F 11/06; E04F 11/062; E04F 11/064; E04F 11/066; E04F 11/068; F16C 11/02; F16C 11/04; F16C 11/045
See application file for complete search history.

(56) References Cited

U.S. PATENT DOCUMENTS

| | | | | |
|---|---|---|---|---|
| 2,562,333 A * | 7/1951 | Ries | ...................... | A47C 21/028 5/504.1 |
| 4,053,028 A | 10/1977 | Loix | ................................. | 182/1 |
| 6,170,842 B1 * | 1/2001 | Mueller | ..................... | B60R 3/02 280/163 |
| 6,536,372 B1 * | 3/2003 | Loeser | .................... | A01K 1/035 119/28.5 |
| 7,096,527 B2 * | 8/2006 | Malik | ................... | A47C 21/028 5/504.1 |
| 7,621,236 B2 | 11/2009 | Steffey et al. | ................ | 119/847 |
| 8,443,736 B2 * | 5/2013 | Martenson | ........... | A47G 9/0284 108/49 |
| 8,978,177 B1 | 3/2015 | Peele | ................. | 5/400 |
| 2004/0251080 A1 | 12/2004 | Kalos | ............................. | 182/35 |
| 2008/0264723 A1 * | 10/2008 | Tatum | .................... | A47C 12/00 182/35 |

OTHER PUBLICATIONS

Pet Loader Original 5-Step Pet Staris ABS "America's Pet Store" 2013 p. 1-3.
Dog Ramp Folds Flat Carpeted 3 Step stairs Plupetstore.com Pet Studio Dog Ramp Folds Flat Carpeted 3 Step Stairs May 15, 2015 p. 1-2.

\* cited by examiner

*Primary Examiner* — Eric J Kurilla
(74) *Attorney, Agent, or Firm* — MacCord Mason PLLC (57) ABSTRACT

An apparatus for aiding a pet in descent and ascent of a bed includes a sleeve configured to be positioned between a mattress and a mattress support on a bed, and a set of steps or ramp sized to fit within the sleeve and configured to be pulled from one end of the sleeve and to extend toward a floor to provide ease of ascent and descent of a pet to a top of the mattress.

17 Claims, 12 Drawing Sheets

COLLAPSIBLE DESCENT AND ASCENT AIDS FOR PETS

BACKGROUND OF THE INVENTION

Many people have small dogs or cats who they allow to sleep on the bed with them at night. For some animals, climbing to the top of the bed is difficult. As a result, it is known to provide various forms of steps to help a small animal climb onto the bed or to descend back to the floor. Such steps remain bed side, 24-hours a day, and can get in the way of other activities. In addition, if it is desired that the bed top be free of the cat or the dog during the day, the steps would then have to be moved away from the side of the bed.

Accordingly, there is a need in the art for an item to allow small dogs or cats to climb to a bed or descend from the bed and yet not be a constant presence in the bedroom.

SUMMARY OF THE INVENTION

The present invention fulfills one or more of these needs in the art by providing an apparatus for aiding a pet in descent and ascent of a bed including a sleeve configured to be positioned between a mattress and a mattress support on a bed, and a device sized to fit within the sleeve and configured to be pulled from one end of the sleeve and to extend toward a floor to provide ease of ascent and descent of a pet to a top of the mattress.

In one embodiment the device is a set of steps. Typically, the set of steps can collapse to a flat configuration for storage within the sleeve. The set of steps may include a main plane projecting from the sleeve to define a step at the height of the bottom of the mattress, and another plane that can be deployed from the main plane to define a step at a different height than the bottom of the mattress. The other plane may suspended below the main plane by pivoting links to the main plane, the other plane may be elevated above the main plane by pivoting links to the main plane, or both kinds of other planes may be included.

The plane that is elevated above the main plain may nest within a gap in the main plane and its pivoting links may nest within slots in the main plane for storage within the sleeve.

For either kind of "other plane" the mounting to the main plain may be by pivoting links. The planes may have trunnions with a cross section having flat vertical sides and the links may have bearings in which the trunnions are mounted. The bearings have a wide portion allowing rotation of an associated trunnion within the link, so the link rotates with respect to the plane. The bearings may also have a narrow portion so the flat vertical sides of the trunnion can nest in the narrow portion to restrain rotation of the link in a deployed step configuration.

In another embodiment the device is a ramp. The ramp may have an elevated plane and a pivoting plane. The elevated plane is typically mounted to the pivoting plane by a turntable for enabling rotation of the pivoting plane about a vertical axis and the turntable has links to the pivoting plane to raise a top end of the pivoting plane above the elevated plane. The ramp may include a primary ramp plane and a secondary sleeve to receive the primary ramp plane.

In each embodiment the planes may have reinforcements to inhibit downward bowing as the plane is deployed from the sleeve. The steps and ramp may have a textured tread surface to aid in increasing friction. The sleeve has an open end from which the device is pulled, and the sleeve desirably has flanges surrounding the open end.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
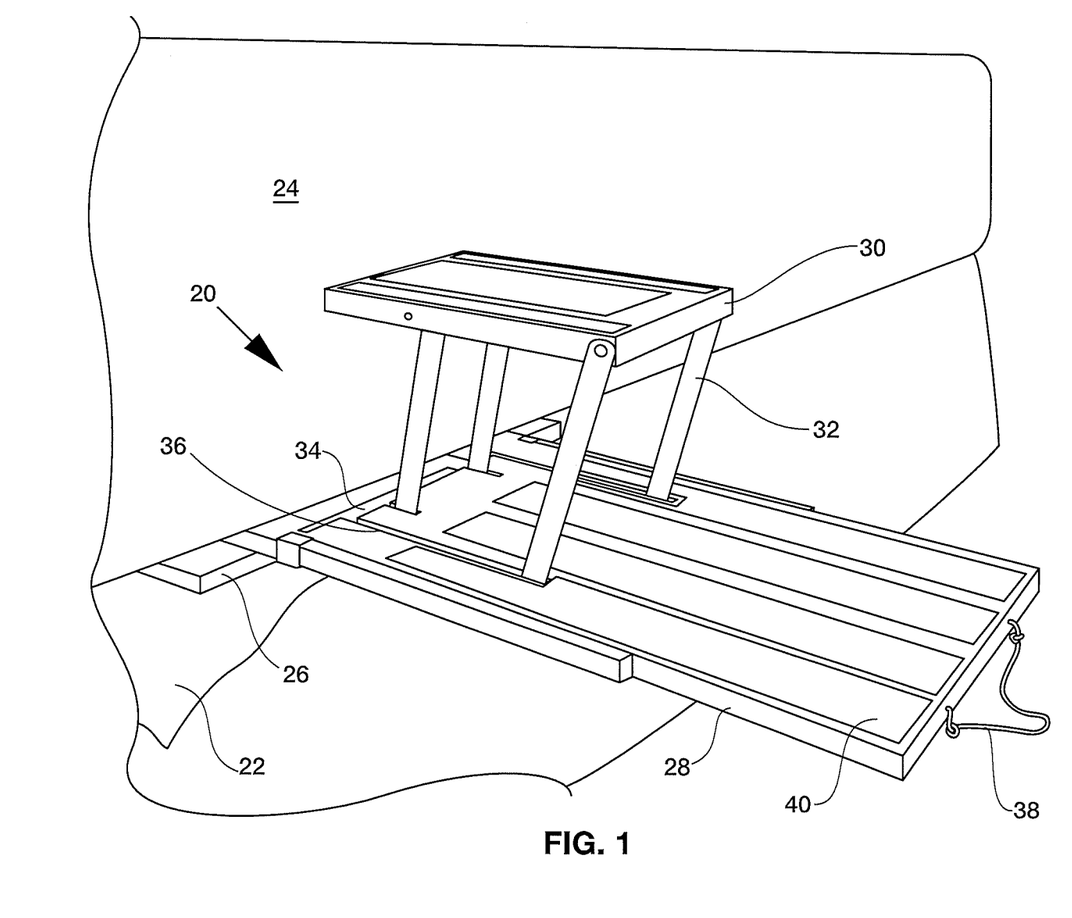
FIG. 1 is a perspective view of a bed with a step embodiment of the invention installed.
Figure 2:
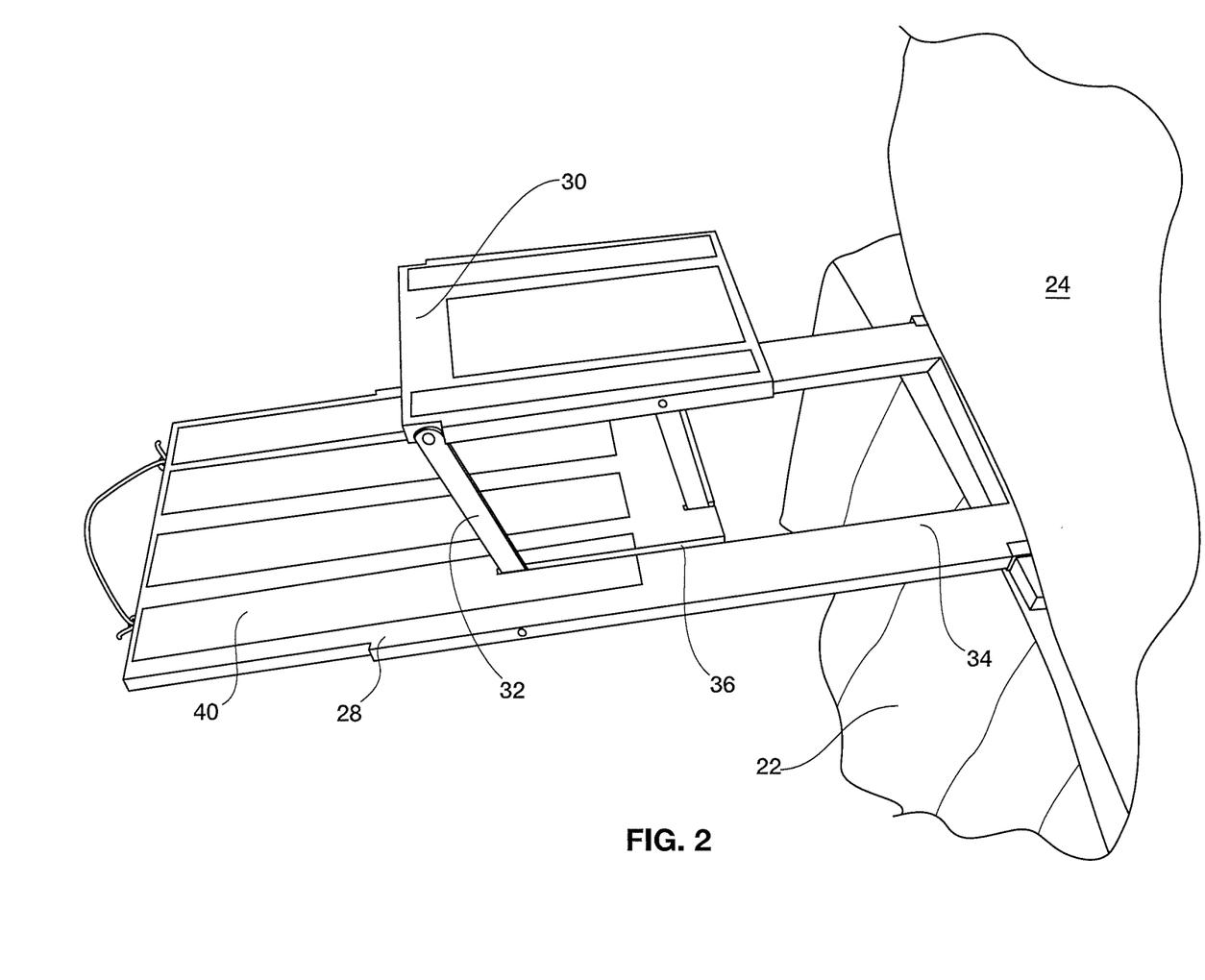
FIG. 2 is a second perspective view of a bed with the embodiment shown in FIG. 1.

FIG. 1 shows a bed having a set of steps in accordance with an embodiment 20 of the invention installed therein. The bed is made up of a conventional foundation 20 or box spring, which is topped with a mattress 24. Nested between the foundation and mattress is a sleeve 26 in which the steps can be housed during the day. As seen in FIGS. 1 and 2, the steps have been deployed from the sleeve 26 and are available for use by the cat or dog. The sleeve and the slideable steps form a combination 20.

The sleeve 26 is wide and flat to be able to accommodate the steps when collapsed, but sturdy enough to prevent itself from collapsing and binding these steps in place so they cannot be withdrawn, or to inhibit their reinsertion into the sleeve 26 when desired, such as in the morning. As can be appreciated, when the bed is made with a conventional bedspread extending down to cover the mattress and foundation, the sleeve and steps are out of the way and hidden from view.

The steps shown in FIGS. 1 and 2 include a main step 28 and another upper step 30. As seen in FIGS. 1 and 2, the upper step has been deployed upward from the main step. FIG. 2 shows an opening 34 in the main plane or main step into which the upper step 30 is pivoted when not in use. The upper step 30 is supported on a parallelogram linkage; links 32 are pivotally mounted in slots 36 in the main step 28. As seen, the fore and aft links can be provided in slots that are staggered from each other. The top of each step has a textured surface 40 to increase the traction to assist the animal in maintaining its footing as it ascends or descends the steps. The embodiment of FIGS. 1 and 2 also includes a handle 38 to assist in pulling the step assembling out of the sleeve 26.

When it is time to go to bed, the step assembly can be pulled out from the sleeve and the step 30 can be raised above the step 28 and then nested back against the mattress as seen in FIG. 1. Thus, the animal has two steps up to the bed top to be able to help it climb or descend from the top of the bed. The links 32 for the top step 30 are preferably of a length so put the top step about halfway up the mattress 24. Of course, commercially available mattress heights are not uniform, so the foregoing provides a general design goal.

Figure 3:
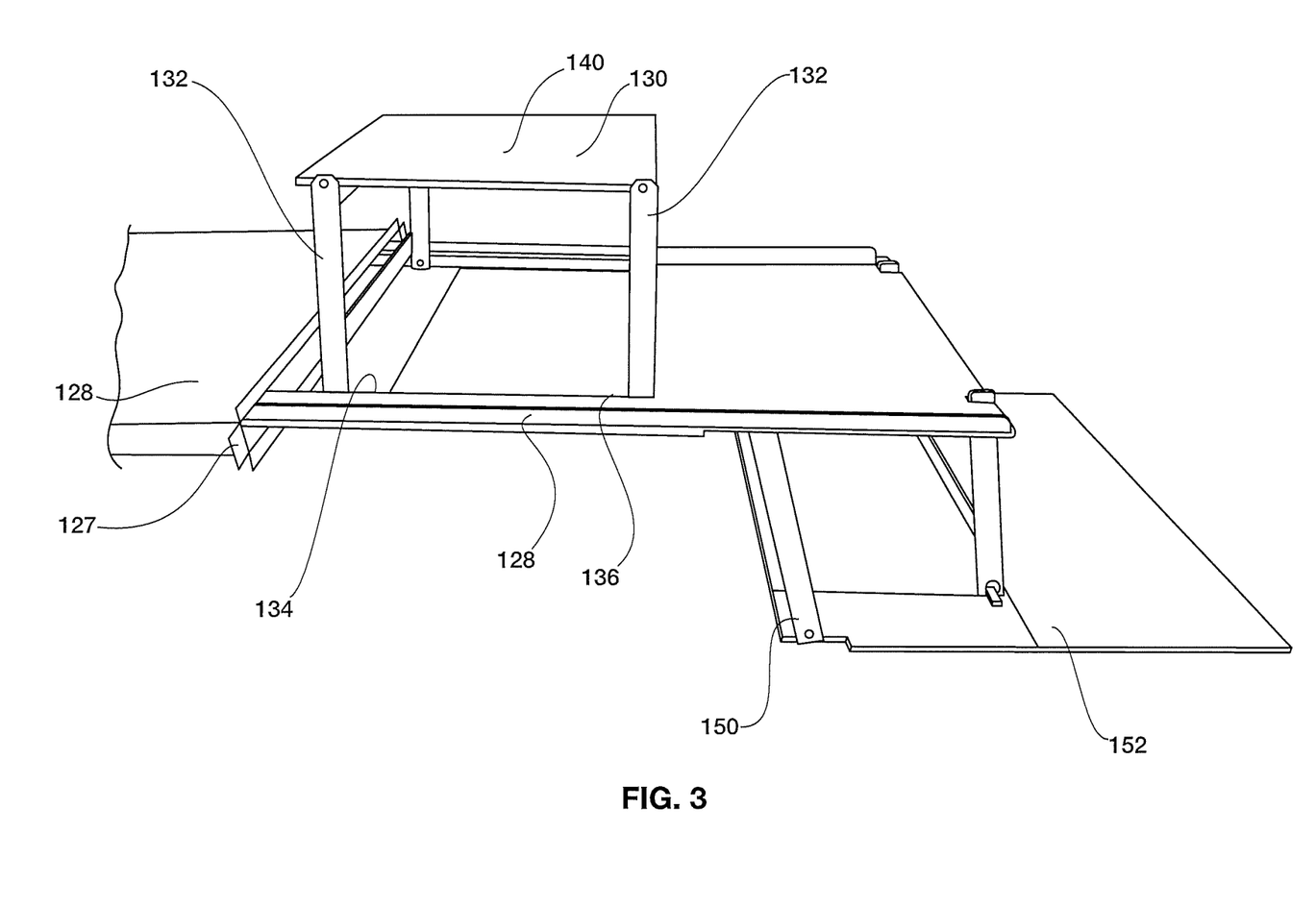
FIG. 3 is a perspective view of another step embodiment, apart from a bed.

FIG. 3 shows another embodiment of the bed steps, without the environment of the mattress. It includes a sleeve 126 having outward flanges 127. As with the first embodiment, in use this embodiment is positioned between a bed foundation and mattress. The flanges 127 help prevent the sleeve from pushing too far into the space between the mattress and the foundation and keep the mouth of the sleeve on the edge of the bed. The main plane or step 128 includes a void or opening 134 in which the upper step 130 can nest. As before, the upper step 130 is supported by links 132. The top surface of the upper step 130 is provided with carpeting or the like to add a textured surface, as is the top of the main step 128 and a lower step 152.

In the stored configuration, the textured surfaces of the three steps are all, more or less co-planar, with the upper surface nested within the opening 134, and the surface of the lower step 152 forming as an extension to the right (in the view of FIG. 3) of the main step 128. The lower step 152 is supported from the main step by links 150, and can pivot on those links from the position shown in FIG. 3 to one where the textured surface of the lower step is essentially co-planar with the textured surface of the main step.

Figure 4:
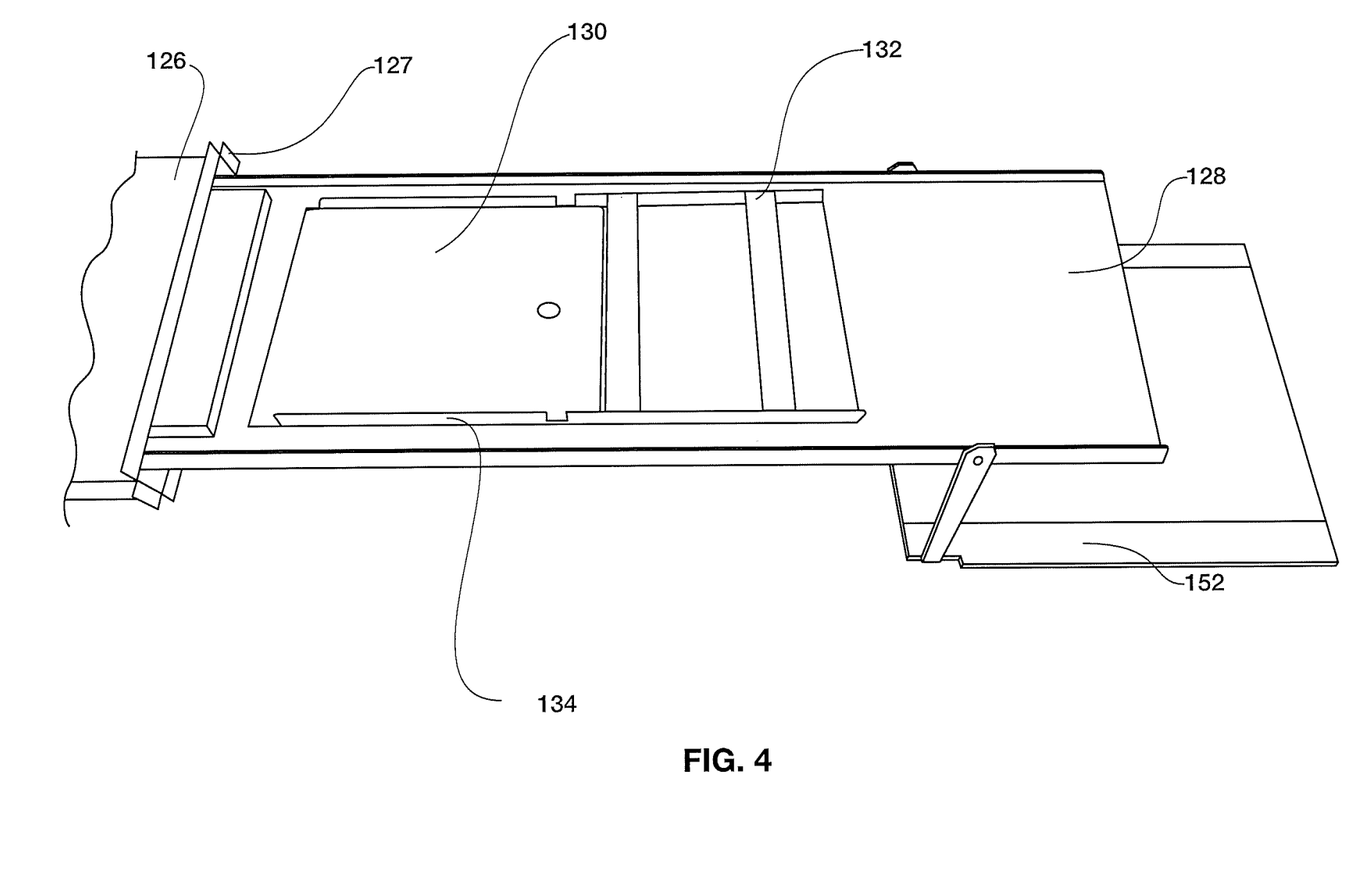
FIG. 4 is a top perspective view of the embodiment of FIG. 3, partially deployed.

FIG. 4 shows the step assembly partially collapsed with the upper step 130 nested in the opening 134 in the main step.

Figure 5:
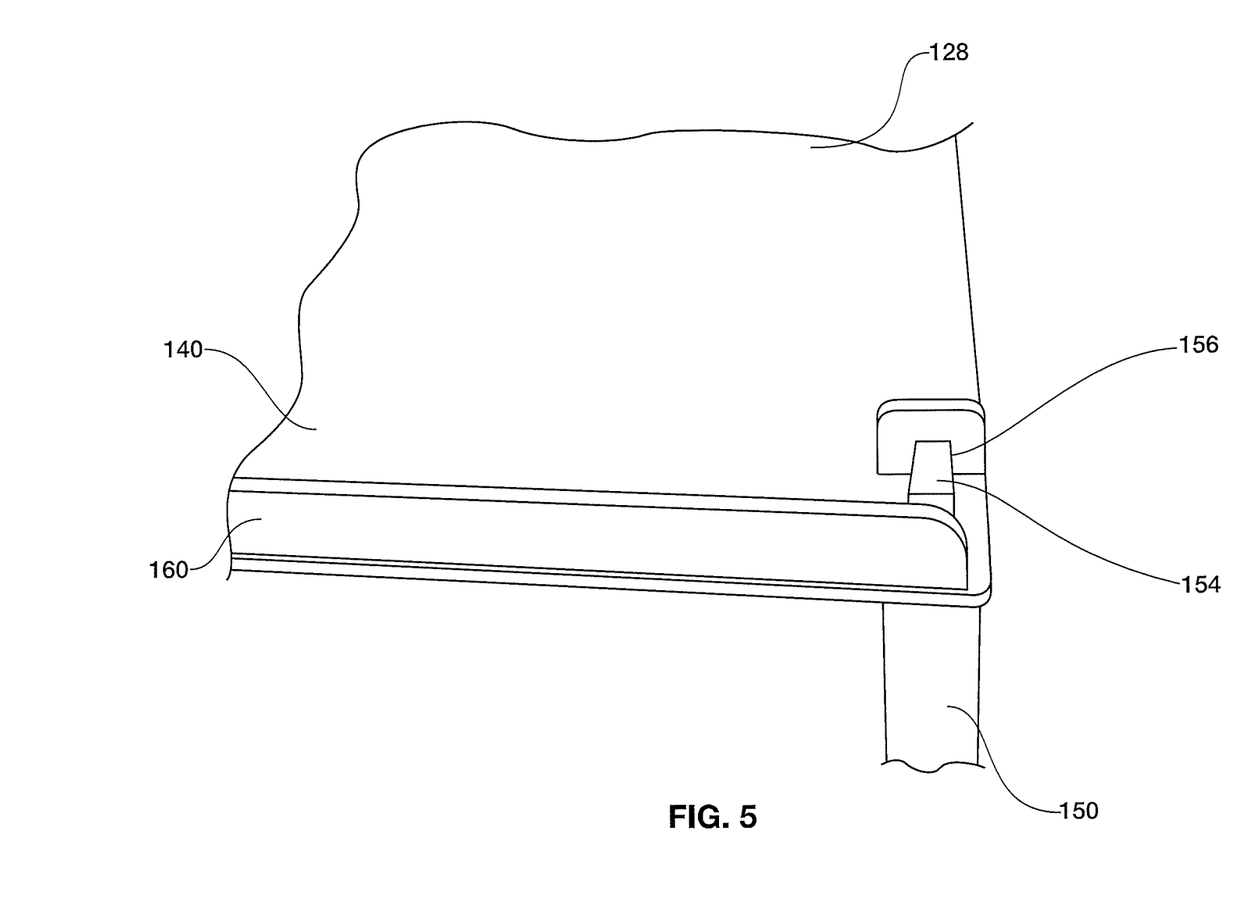
FIG. 5 is an enlarged view of part of the embodiment of FIG. 3

FIG. 5 shows a detail of the link 150 depending from the main step 120. A trunnion 154 with a square cross section is formed on the main step 128. An opening or bearing in the link 150 has a cross section as seen upside down in FIG. 9B with a wider, round portion 158 and a more rectangular, narrower portion 156. As seen in FIG. 5, the trunnion 154 is nested in the narrower portion 156 of the bearing to prevent rotation and provide stability for the link. At the bottom of the link 150, a mirror image (not the same as shown in FIG. 9B and not upside down) trunnion-and-bearing relationship exists with respect to the bottom of the link 150 and the lower step 152, again preventing rotation and locking the step in position. When it is desired to collapse the lower step 152 from this configuration, the lower step 152 is lifted slightly so that the four trunnions of the lower step pass from the narrow portions 156 to the wider, round portions 158, enabling rotation of the link from the deployed configuration to a more co-planar orientation so the steps can be pushed to slide back into the sleeve 126.

FIG. 5 also shows a reinforcement 160 formed on the edge of the main step 128. This reinforcement adds structural strength and prevents the bowing of the main step under the weight of the animal.

The trunnion and bearing configuration just described can also be used in connection with the links for the upper step 130 in like fashion. In this case, the narrower part 156 of the top bearing is toward the bottom, so when in use, the trunnion of the top step can be held down into the narrow part 156 by gravity. The reverse orientation is used on the lower bearing. To collapse the deployed top step, the top step is lifted so the trunnions pass into the wider, round part of the bearing, enabling rotation of the links as the top step moves downward into the opening 134.

Figure 6:
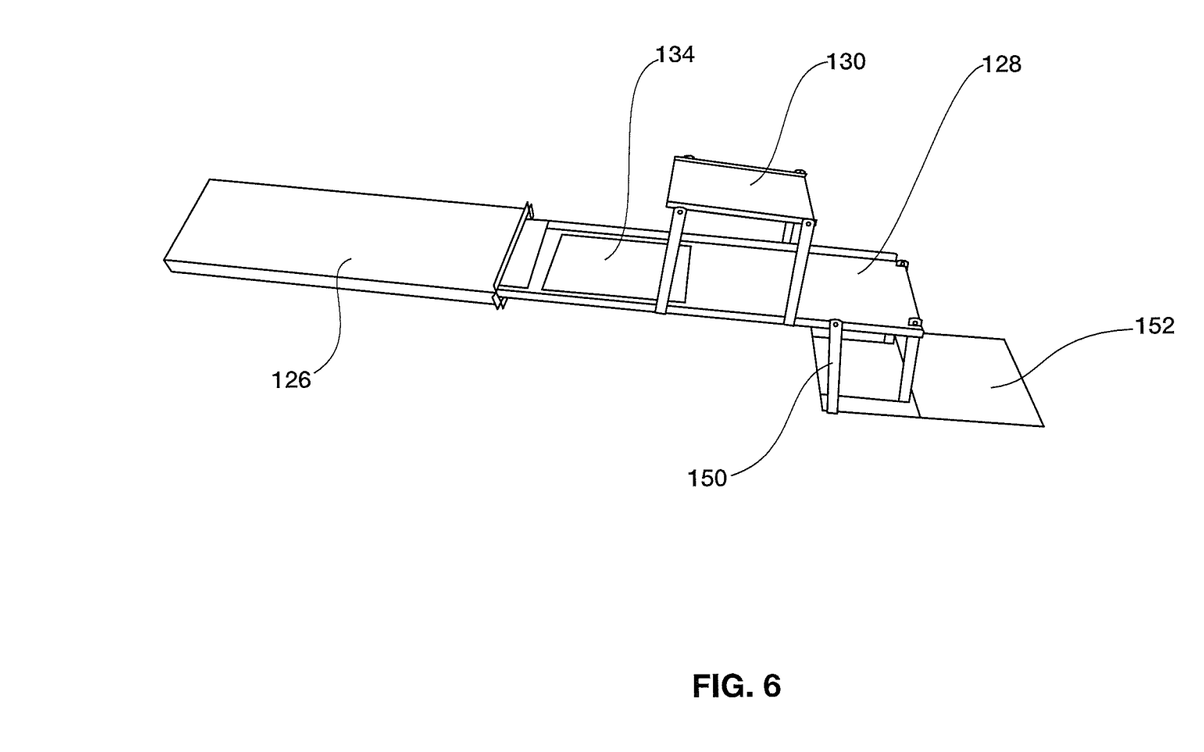
FIG. 6 is a perspective view of an extended deployment of the embodiment of FIG. 3.

FIG. 6 shows the step pulled out from the sleeve 126 by an extraordinary amount, to allow the parts to be better seen.

Figure 7:
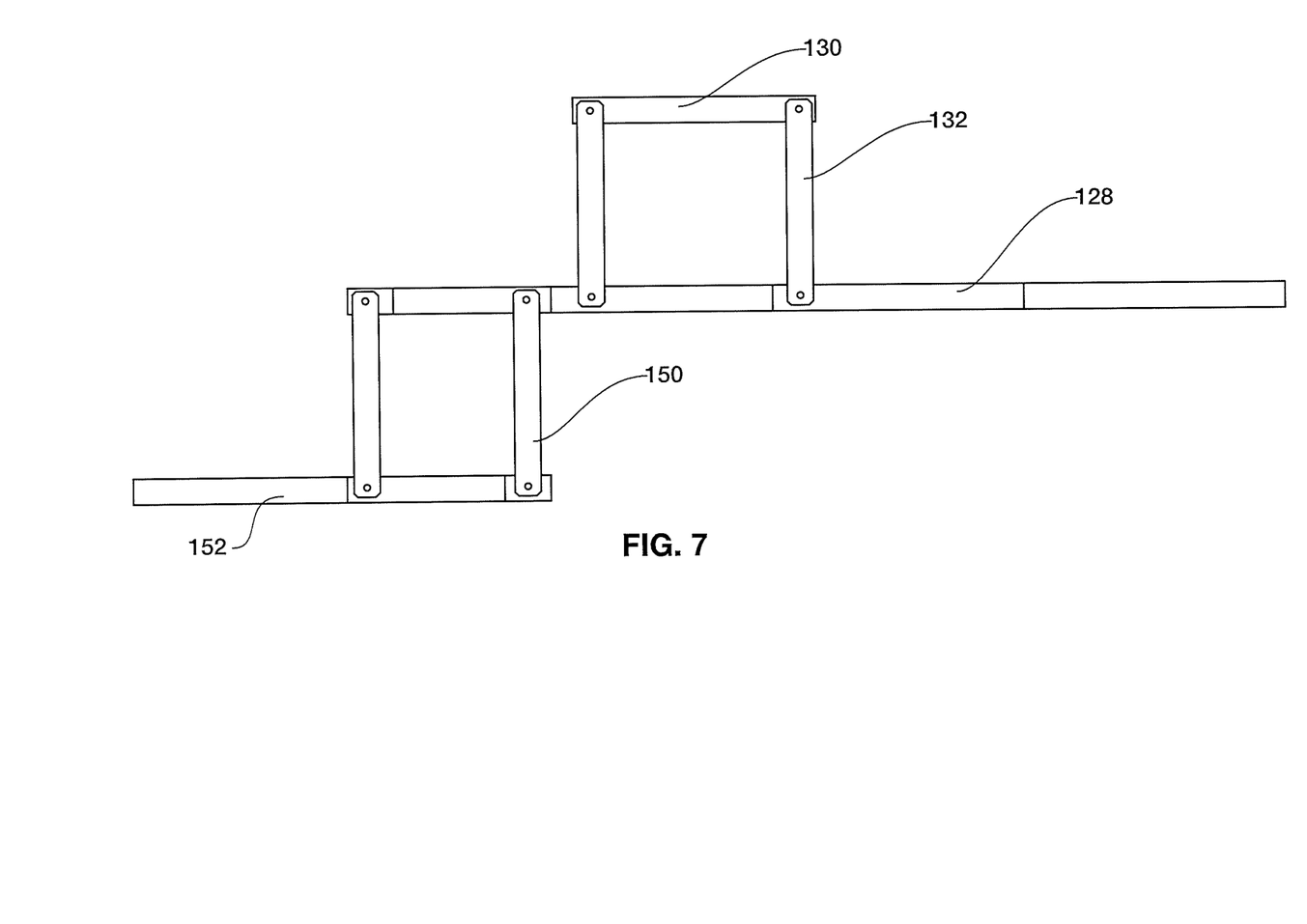
FIG. 7 is a side schematic view of the embodiment of FIG. 3.

FIG. 7 is a side schematic view showing the various links 132 and 150 and the steps 128, 130 and 152.

Figure 8:
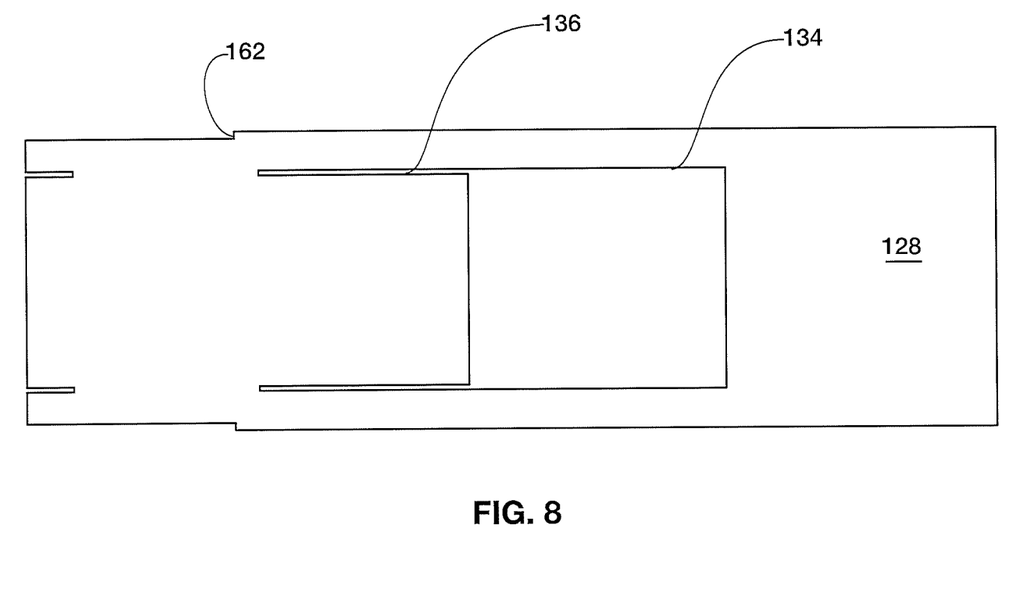
FIG. 8 is a top plan schematic view of a main plane or step of the embodiment of FIG. 3.

FIG. 8 is a top view of the main step 128 showing the cut out 134 for the top step and slots 136 in which the links 132 for the upper step can nest when the upper step 130 is nested within the opening 134. Also, a narrowing 162 is provided in the main step to provide room for the links 150 to the lower step 152.

Figure 9A:
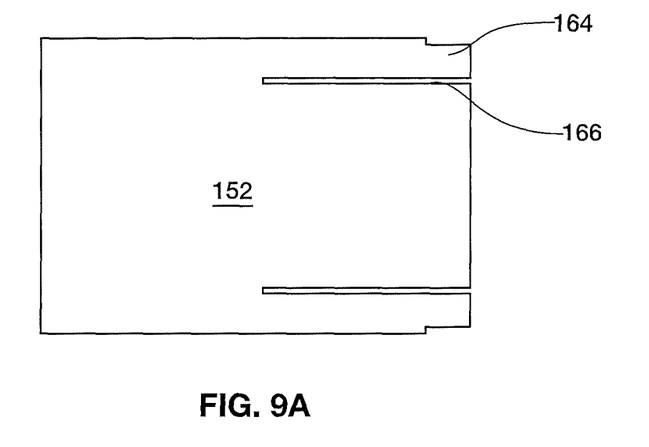
FIG. 9A is a top plan schematic view of the lower step of the embodiment of FIG. 3.
Figure 9B:
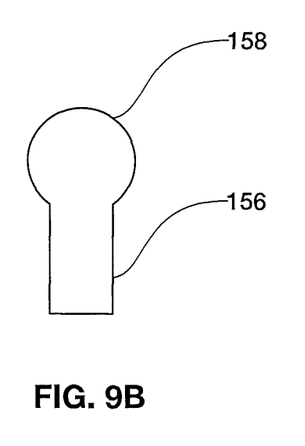
FIG. 9B is schematic view of the shape of bearings used for the links to the steps.

FIG. 9A shows the lower step 152 and a complementary slot 166 and narrowing 164 to receive the respective links suspending the step 152 from the step 128.

Figure 10:
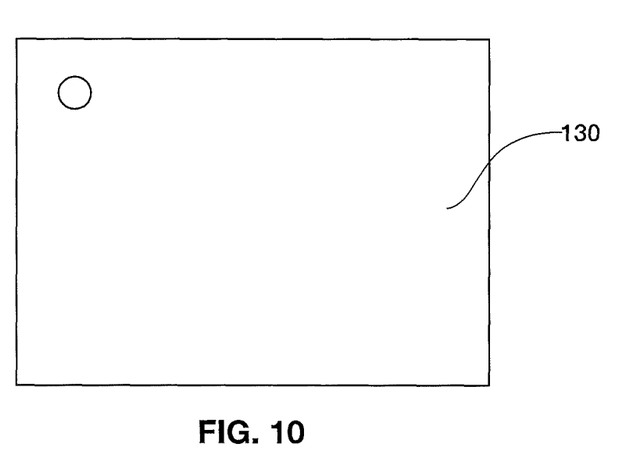
FIG. 10 is a top plan schematic view of the upper step of the embodiment of FIG. 3.

FIG. 10 is a top view of the top step 130.

Figure 13:
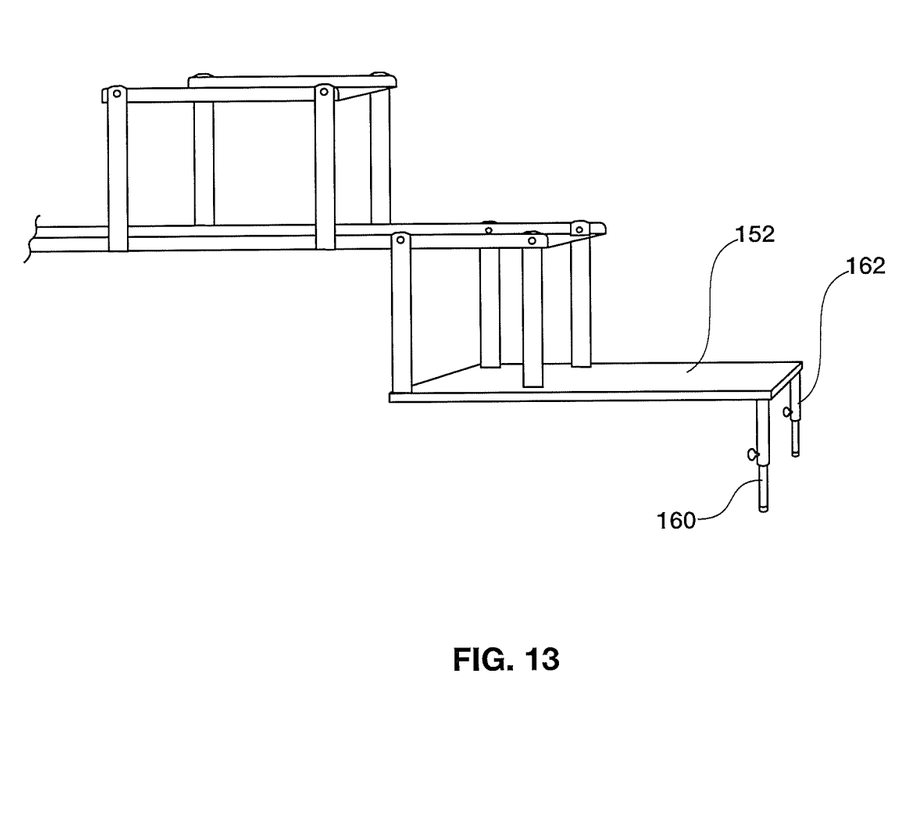
FIG. 13 shows another step embodiment in which the lowermost step is provided with two legs that can pivot downward from a horizontal, stored position to a vertical, deployed position (as shown) to rest on the floor and provide additional support and stability.

FIG. 13 shows another step embodiment in which the lower step 152 is provided with two legs 160, 162 that can pivot downward from a horizontal, stored position to a vertical, deployed position (as shown) to rest on the floor and provide additional support and stability. In some embodiments only one leg is included and the leg(s) can pivot from connection(s) to the lower other than on the corners. The leg length may be made adjustable, such as by a male/female threaded connection. Such an adjustability allows for variations in the height of the lower step 152 above the floor that can be caused variations in bed and mattress dimensions.

Figure 11:
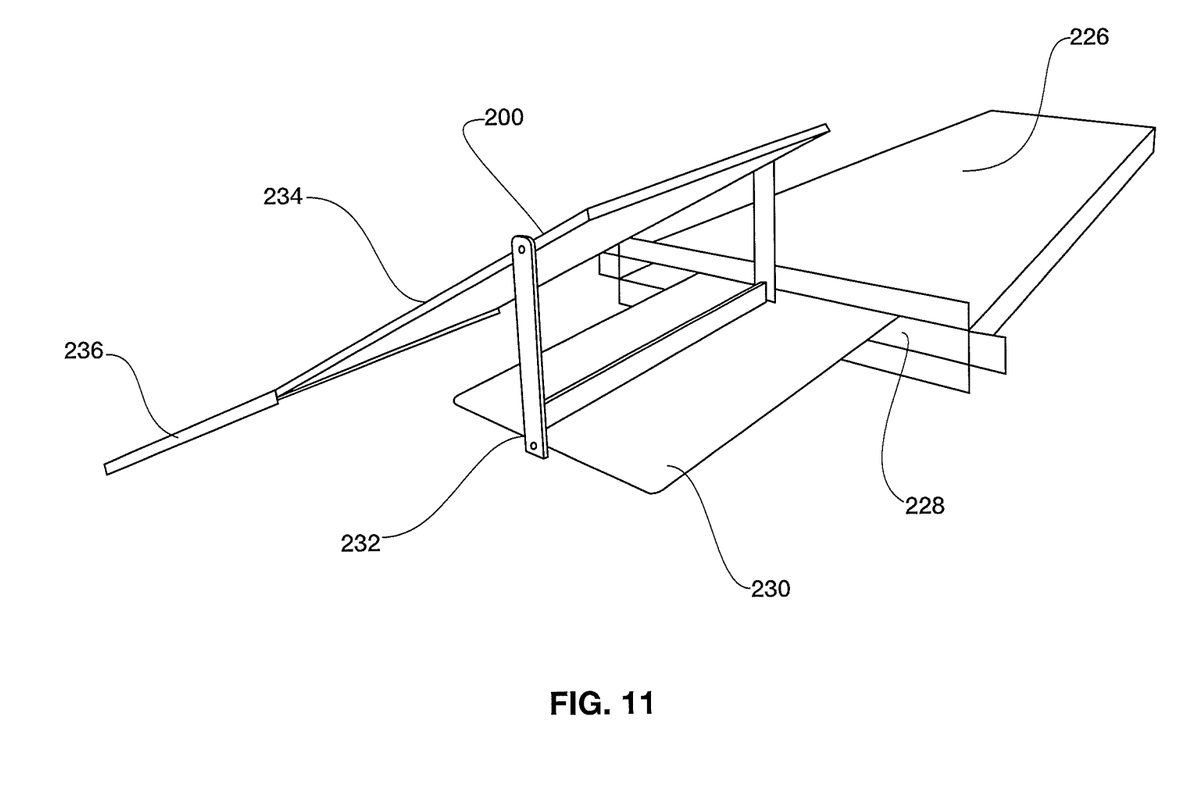
FIG. 11 is a perspective view of a ramp embodiment.
Figure 12:
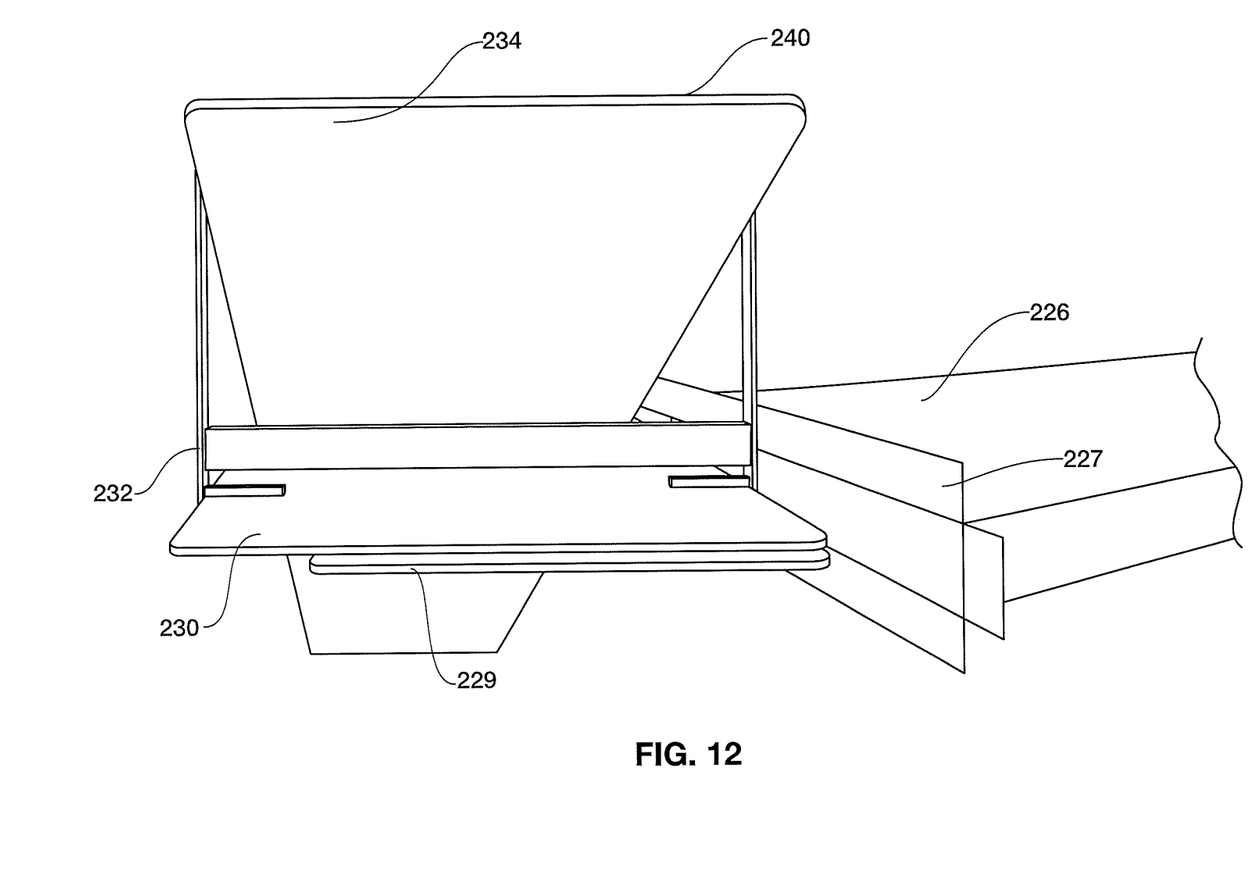
FIG. 12 is a perspective view of the ramp embodiment showing the turntable mount.

FIGS. 11 and 12 show an alternative embodiment of a device for assisting pets in ascending or descending a bed. It, too, has a sleeve 226 with flanges 228, a main plane 229 having a top surface with a turn table plate 230. The plate 230 has links 232 linking the plate 230 to an upper part of a ramp 234. The upper part of the ramp 234 may nest in a ramp sleeve 236, as seen in FIG. 11. The links 236 of this embodiment may be provided with the same trunnion and two-part bearing as described above to permits the link to maintain an upright position to hold the top of the ramp 234 above the main plane 229. It will be recalled that the sleeve 226 nests between a mattress and foundation when in use. So, the link 232 raising the ramp 234 above the main plane 229 is helpful to fill the gap in the space between the bottom of the mattress and the top of the mattress.

The pivoting feature of the turn table 230 with respect to the main plane 229 is not essential. However, providing the pivoting action allows the ramp to be deployed along the side the edge of the bed, taking up less room in the bedroom than if it extended at a right angle to the bed side.

To store the ramp shown in FIGS. 11 and 12, one can simply raise the end with the ramp sleeve 236 and push the ramp sleeve 236 so that it encapsulates the lower portion of the ramp top 234, rotate the turn table 230 with respect to the main plane 229 so that the ramp aligns with the sleeve 226. The top of the ramp can then be raised to free the links and the top of the ramp can then be pivoted downwardly to be generally on the same plane as the main plane 229. The assembly can then be slid back into the sleeve 226. To deploy the ramp in the evening, the ramp can be simply pulled out from the sleeve, pivoted on turn table 230 and have the top end raised and the lower end 236 extend down from the upper ramp portion 234.

The embodiments of FIGS. 3 through 12 can also be provided with handles like the handle 36 of the first embodiment.

Various materials can be used to make the invention, as long as they provide the structural strength needed for the activities as described.

The embodiments disclosed enable a small animal to climb the steps or ramp as the case may be, when deployed at the option of the owner. When desired, the steps or ramp can be concealed within the associated sleeve between the mattress and foundation, out of sight and out of the way. The pet can then also be prevented from taking up residence on the bedspread during the day.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for aiding a pet in descent and ascent of a bed comprising
    a sleeve configured to be positioned between a mattress and a mattress support on a bed, the sleeve having an open end and flanges surrounding the open end, and
    a device sized to fit within the sleeve and configured to be pulled from sae the open end of the sleeve and to extend toward a floor to provide ease of ascent and descent of a pet to a top of the mattress and to be pushed into the open end of the sleeve,
    wherein the flanges surrounding the open end inhibit the open end of the sleeve from being pushed between a mattress and mattress support when the device is pushed into the open end of the sleeve.

2. An apparatus as claimed in claim 1 wherein the device is a set of steps.

3. An apparatus as claimed in claim 2 wherein the set of steps collapse to a flat configuration for storage within the sleeve.

4. An apparatus as claimed in claim 2 wherein the set of steps include a main plane projecting from the sleeve to define a step at the height near the bottom of the mattress, and another plane that can be deployed from the main plane to define a step at a different height than the bottom of the mattress.

5. An apparatus as claimed in claim 4 wherein the other plane is suspended below the main plane by pivoting links to the main plane.

6. An apparatus as claimed in claim 5 wherein the other plane has at least one leg pivotally mounted so the leg can pivot downward from a horizontal, stored position to a vertical, deployed position.

7. An apparatus as claimed in claim 4 wherein the other plane is mounted to the main plain by pivoting links, the planes have trunnions with a cross section having flat vertical sides and the links have bearings in which the trunnions are mounted, the bearings having a wide portion allowing rotation of an associated trunnion within so the link rotates with respect to the plane, and a narrow portion so the flat vertical sides of the trunnion can nest in the narrow portion to restrain rotation of the link in a deployed step configuration.

8. An apparatus as claimed in claim 4 wherein the main plane has reinforcements to inhibit downward bowing as the main plane is deployed from the sleeve.

9. An apparatus as claimed in claim 2 in which the steps have a textured tread surface to aid in increasing friction.

10. An apparatus as claimed in claim 1 wherein the device is a ramp.

11. An apparatus as claimed in claim 10 wherein the ramp has an elevated plane and a pivoting plane.

12. An apparatus as claimed in claim 11 wherein the elevated plane is mounted to the pivoting plane by a turntable for enabling rotation of the pivoting plane about a vertical axis and the turntable has links to the pivoting plane to raise a top end of the pivoting plane above the elevated plane.

13. An apparatus as claimed in claim 10 wherein the ramp includes a primary ramp plane and a secondary sleeve to receive the primary ramp plane.

14. An apparatus as claimed in claim 10 wherein the ramp has a textured tread surface to aid in increasing friction.

15. An apparatus for aiding a pet in descent and ascent of a bed comprising
    a sleeve configured to be positioned between a mattress and a mattress support on a bed, the sleeve having an open end and flanges surrounding the open end, and
    a set of steps sized to fit within the sleeve and configured to be pulled from the open end of the sleeve and to extend toward a floor to provide ease of ascent and descent of a pet to a top of the mattress, the set of steps including a main plane projecting from the sleeve to define a step at the height near the bottom of the mattress, and another plane that can be deployed from the main plane to define a step at a different height than the bottom of the mattress,
    wherein the other plane is elevated above the main plane by pivoting links to the main plane.

16. An apparatus as claimed in claim 15 wherein the other plane nests within a gap in the main plane and the pivoting links nest within slots in the main plane for storage within the sleeve.

17. An apparatus for aiding a pet in descent and ascent of a bed comprising
    a sleeve having an open end from which a set of steps can be pulled and having flanges surrounding the open end, the sleeve configured to be positioned between a mattress and a mattress support on a bed, and
    the set of steps sized to fit within the sleeve, having a textured tread surface, and configured to be pulled from the open end of the sleeve to provide ease of ascent and descent of a pet to a top of the mattress, wherein the set of steps can collapse to a flat configuration for storage within the sleeve,
    the set of steps including a main plane projecting from the sleeve to define a step at the height of the bottom of the mattress and having reinforcements to inhibit downward bowing as the main plane is deployed from the sleeve, and upper and lower steps that can be deployed from the main plane to define a step at a height above and below the bottom of the mattress respectively, wherein the lower step is suspended below the main plane by pivoting links to the main plane and the upper step is elevated above the main plane by pivoting links to the main plane and wherein, when stored within the sleeve, the upper step nests within a gap in the main plane and the pivoting links of the upper step nest within slots in the main plane.

* * * * *

UNITED STATES PATENT AND TRADEMARK OFFICE
CERTIFICATE OF CORRECTION

PATENT NO. : 11,147,236 B1
APPLICATION NO. : 16/138005
DATED : October 19, 2021
INVENTOR(S) : Anthony Willis Page 1 of 1

It is certified that error appears in the above-identified patent and that said Letters Patent is hereby corrected as shown below:

In the Claims

In Column 5, Line 27, --pulled from sae the open end of the sleeve-- should read "pulled from the open end of the sleeve"

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*